Oct. 27, 1925.　　　　　J. A. STEINMETZ　　　　　1,558,713
SAFEGUARDING AGAINST AERIAL ATTACKS
Filed Nov. 3, 1923

Inventor
Joseph A. Steinmetz
By
Attorneys

Patented Oct. 27, 1925.

1,558,713

UNITED STATES PATENT OFFICE.

JOSEPH A. STEINMETZ, OF PHILADELPHIA, PENNSYLVANIA.

SAFEGUARDING AGAINST AERIAL ATTACKS.

Application filed November 3, 1923. Serial No. 672,539.

*To all whom it may concern:*

Be it known that I, JOSEPH A. STEINMETZ, a citizen of the United States, and resident of Philadelphia, in the county of Philadelphia and State of Pennsylvania, have invented certain new and useful Improvements in Safeguarding Against Aerial Attacks, of which the following is a specification, reference being had therein to the accompanying drawing.

It is said by high authorities that it is now quite possible to destroy cities, land defenses, massed bodies of men, water-borne ships, etc., by dropping from aircraft single enormous masses, or multiple smaller masses, of very high explosives, provided that there is at the moment at or near the point of attack no means of defense nor for barring such attack. It is further said by such authorities that, so far, only opposing aircraft can afford any adequate defense, since attacking aircraft can select any of countless points, deliver a blow and escape before aid can be summoned. It is obviously impracticable to provide at every vulnerable point of a large region, ordinary devices capable of overcoming suddenly-attacking aircraft, for the cost of such provision is prohibitive, especially when the number of men is considered.

The object of this invention is to obtain at relatively small cost a fair degree of security against such attacks as have just been suggested.

In general terms, the method involved consists in barring attacking craft from regions where they might drop destructive bombs. Such barring is through dropping, from small, very high speed aircraft, preferably of the "scout plane" type a series of light parachutes, each bearing a contact bomb, or other destructive device, suspended by a long light cable, which may be a small wire.

Figure 1:
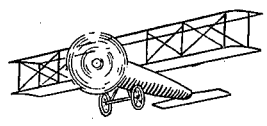
Figure 1:
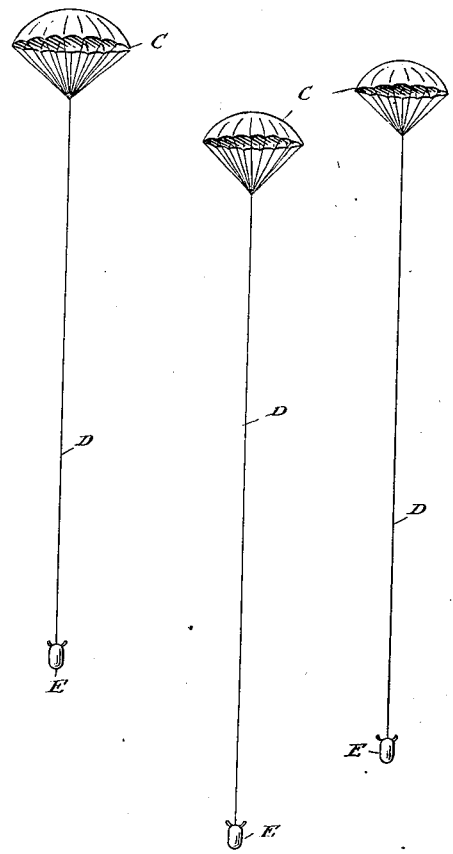

In the accompanying diagrammatic drawings:

Fig. 1 shows in perspective an attacking airship and a scout plane moving transversely at a greater height.

Figure 2:
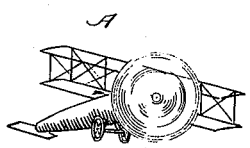
Figure 2:
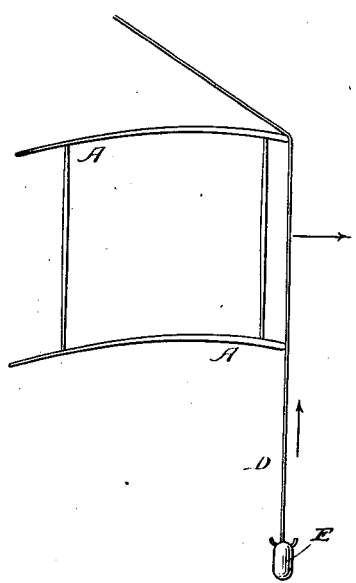

Fig. 2 indicates the deflection of the bomb-carrying parachute cable by attacking aircraft.

In these drawings, A designates the more or less distant attacking craft, which may be a "bombing plane", B a small, high-speed scout plane at a greater elevation, carrying a series of primarily folded parachutes C, each to be released at will, in any well-known way, by an operator carried by the plane, and each having attached by a cable D, of predetermined length, a contact bomb or other destructive device E.

Should any transversely moving aircraft strike such a cable, the bomb would be quickly drawn against the contacting portion of the aircraft and the latter would probably be destroyed by such contact. The cables are invisible in poor light and visible at no great distance in any light, and entirely invisible at night, as are the bombs and parachutes, practically.

One or more scout planes may ascend at some distance from the region to be protected and on the side from which the attack comes, or is expected, and while moving transversely with respect to the line of attack and above the plane of attack, free at intervals bomb-carrying parachutes. By this means a sort of screen is provided through which any attacking craft can hardly pass safely to reach any point from which it can effectively drop bombs of the highly destructive nature above mentioned.

Preferably, when necessity arises, danger signals will be given, and the nearest scout plane, or planes, will rise and spread the curtain above mentioned, while aid is coming from points within signalling distance.

It may be noted that the bombing plane carrying heavy masses of explosive is necessarily large and incapable of very high speed or of making quick ascents and turns, while the small scout planes move rapidly and rise or turn with relatively great rapidity, thereby having no difficulty in keeping in any desired position with respect to the slower and more unwieldy machine.

The protection is of course only temporary, but the parachutes are light and of large diameter, descending slowly, the interval being quite sufficient, practically to cover the time before the bomber reaches the barrage.

What I claim is:

1. The method of defending against aerial attack which consists in releasing at intervals from moving aircraft a series of parachutes each supporting far below a contact bomb by means of a cable transverse to both the direction and probable plane of attack to form a slowly descending barrage of aerial bombs.

2. The method of defending against aircraft attack which consists in causing a high-speed aeroplane to ascend to a suitable height while bearing a series of bomb-carrying parachutes releasable at will, in succession, by an operator carried upon the aeroplane, and to move above the plane of attack transversely to the direction of attack, releasing parachutes at intervals, each bomb being supported from its parachute by a cable of adjustable length to form a slowly descending barrage of aerial bombs.

3. The method of defending a given area against the dropping of explosive masses from aircraft, which consists in barring such aircraft from the region immediately above said area by dropping from a line alongside said area and above the plane of attack a spaced series of contact bombs supported by corresponding parachutes to form a slowly descending barrage of aerial bombs.

4. The method of defending a given locality against attack by aircraft entering the region above such locality and dropping highly explosive masses, which consists in barring aircraft from said region by freeing at intervals alongside that region and above the horizontal plane of attack, a spaced series of highly destructive bodies effective through contact and suspended by small cables from a corresponding series of parachutes to form a slowly descending barrage of aerial bombs.

5. The method of defending against aerial attack by means of a barrage of slowly descending aerial bombs which consists of carrying by aircraft to an elevation above the probable plane of attack and there releasing a series of bomb carrying parachutes in a direction transverse to the direction of attack, each of said bombs being supported from its parachute by a cable of adjustable length.

In testimony whereof I hereunto affix my signature.

JOSEPH A. STEINMETZ.